Nov. 16, 1971  H. C. SCHMID  3,620,023

PULSATING VALVES

Filed July 25, 1969

*INVENTOR.*
HOWARD C. SCHMID

United States Patent Office 3,620,023
Patented Nov. 16, 1971

3,620,023
PULSATING VALVES
Howard C. Schmid, 2700 Queen St.,
Missoula, Mont. 59801
Filed July 25, 1969, Ser. No. 844,857
Int. Cl. E02d *13/00;* B05b *15/02;* F16k *25/00*
U.S. Cl. 61—13   1 Claim

ABSTRACT OF THE DISCLOSURE

A device for use in sub-surface soil irrigators which pulsates from water pressure preventing ingress of roots and soil having a flexible feeder tube to prevent inlet clogging.

My invention relates to a device for controlling the flow of liquid from a reservoir, tube, or pipe and particularly to such a device which may serve as a valve for irrigating systems in lawns, areas of turf, gardens, and fields.

Sub-surface soil irrigators are assailed constantly by the very members through which they nurture the plants to be irrigated, the roots. Hydrotropism makes sub-surface irrigation the most practical of all irrigation systems while at the same time resulting in failure of systems not designed to withstand the onslaught of roots. First consideration must be given to efficiency, that is, performance desired for a permanency commensurate with cost. Next consideration is cost of manufacture and installation which must be feasible for the service rendered. My present invention pulsating continuously during operation and being completely closed while inoperative is obviously impervious to roots.

A primary object of my invention is to provide a valve permitting egress of water while at the same time moving or pulsating from the water pressure to prevent ingress of roots and soil.

A further primary object of my invention is to provide a valve having a plurality of small inlet openings at the extremity of a hollow, flexible stem communicating with the larger passageway within stem thus eliminating clogging of stem passageway while permitting full flow of fluid through said stem which at the same time bends and flexes from movement of fluid within pipe in which inserted causing inlet openings to distort tending to loosen and dislodge foreign particles which may be in fluid supply.

More particularly my present invention comprises a valve of elliptical shape which when inserted into a pipe responds to fluid pressure in pipe by tending to become round then belching the fluid until again filled to repeat the process, also the inlet holes being smaller than the stem passageway and at the end of the flexible stem cleanse themselves with movement in the fluid. The valve of resilient plastic or other suitable material installed at a predetermined pressure against the exterior of the pipe or vessel in which installed, wipe their area of pipe surface clean with each pulsation.

Still further my invention proposes the construction of a pulsating valve as briefly described which is simple in construction, efficient in operation, and which may be manufactured and sold at a reasonable cost.

For further comprehension of my invention and the objects and various other advantages thereof, reference will be had to the following description and accompanying drawing, but this further disclosure and description is to be taken merely as an exemplification of the invention and the same is not limited thereby.

Referring to the drawing.

Figure 1:
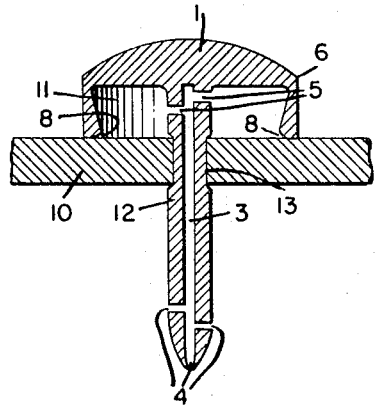
FIG. 1 is a vertical cross-sectional end view of the valve constructed in accordance with the invention.
Figure 2:
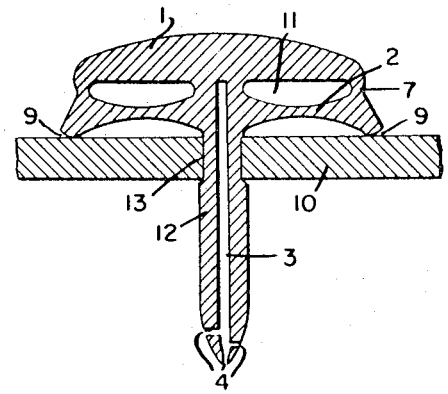
FIG. 2 is a vertical cross-sectional side view.
Figure 5:
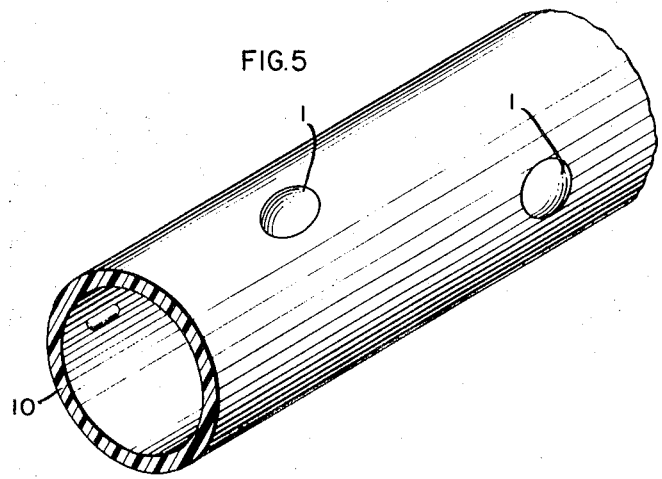
FIG. 5 is a perspective of a pipe showing installation of the embodiment of the invention.
Figure 3:
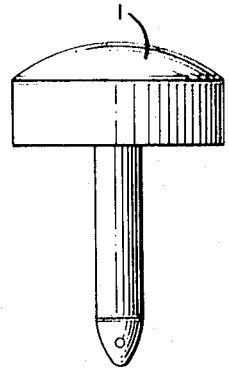
FIG. 3 is an end elevation of the valve.
Figure 4:
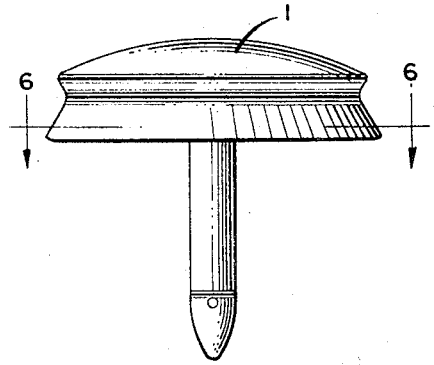
FIG. 4 is a side elevation of the valve.
Figure 6:
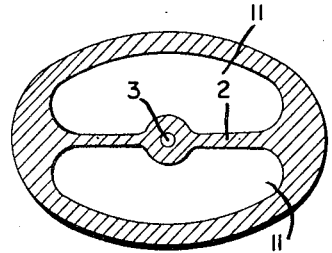
FIG. 6 is a cross-sectional view taken along line 6—6 of FIG. 4.

Referring now to FIGS. 1, 2, and 6 of the drawing, stem 12 of valve 1 is forced through hole 13 when installed in pipe 10 to produce a predetermined pressure of peripheral rim at arcs 8 and 9 against exterior surface of pipe 10 thereby sealing chamber 11 except inlets 5. Fluid enters pipe 10 flowing into passageway 3 through openings 4 and up stem 12 through openings 5 into chamber 11. When sufficient pressure is exerted by fluid in chamber 11 the sides move out at the bottom pivoting at point 6 due to the thinner wall at that point larger side wall surface, restraining transverse member 2, heavier end walls, said side wall being vertical to the installation pressure. Arc 8 rubs along outer surface of pipe 10 as the pivotal point of its radius is at 6. As the side walls pivot out the end walls pivot in with points 7 the pivotal points and arcs 9 rubbing the exterior surface of pipe 10, transverse member 2 folds when ends pivot in then increasing pressure overcomes the resistance of valve body which flutters up, belches forth the confined fluid then settles to its original shape and position to repeat the activity as fluid flows in to refill chamber 11. The preferred embodiment being of resilient plastic material permits stem 12 to move as the fluid flows in pipe 10 tending to cleanse small openings 4.

From the foregoing description it is obvious that the present invention provides a valve particularly suited for use in sub-surface soil irrigators which is impervious to root growth and other types of clogging.

While the instant invention has been shown and described herein in what is conceived to be the most practical and preferred embodiment it is not my intention to limit the protection sought to that field or the disclosure when it is understood that modification and substitution may be incorporated in said embodiment without departing from the spirit of the invention.

I therefore desiring to protect by Letters Patent do claim:

1. A pulsating valve device comprising a dome-like hollow elliptical shaped body of resilient material having end and side walls extending downwardly from said dome-like body, the portion of the walls adjacent the body having a reduced thickness relative to the rest of the wall portions thereby forming an axis pivot for said walls, the lower edges of the walls being of convex configuration, with the lowermost portion of the arc on the end walls adjacent the inner side of the end walls and the lowermost portion of the arc on the side walls adjacent the outer side of the side walls, a stem member extending from the center portion of the inner surface of the dome body to below the lower edges of the side and end walls, a passageway extending longitudinally through the stem and lateral openings extending from the outer periphery of the stem communicating with the passageway and a connecting member extending from the stem to each of the end walls.

References Cited

UNITED STATES PATENTS 2,933,102  4/1960  Hillman et al. _____ 137—525.3
3,292,378  12/1966  Rosenthal et al. _____ 61—13

JACOB SHAPIRO, Primary Examiner

U.S. Cl. X.R.

137—525.3, 624.14; 239—547, 570; 251—145